US010625844B2

(12) United States Patent
Anast

(10) Patent No.: US 10,625,844 B2
(45) Date of Patent: Apr. 21, 2020

(54) FUSELAGE WITH STRUCTURAL AND NON-STRUCTURAL STANCHIONS

(71) Applicant: The Boeing Company, Chicago, IL (US)

(72) Inventor: Peter Z. Anast, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 116 days.

(21) Appl. No.: 14/537,791

(22) Filed: Nov. 10, 2014

(65) Prior Publication Data

US 2016/0129986 A1 May 12, 2016

(51) Int. Cl.
*B64C 1/06* (2006.01)
*B64C 1/18* (2006.01)

(52) U.S. Cl.
CPC .............. *B64C 1/069* (2013.01); *B64C 1/061* (2013.01); *B64C 1/18* (2013.01)

(58) Field of Classification Search
CPC ................................................ B29C 66/7212
USPC ........................................................ 244/119
See application file for complete search history.

(56) References Cited

U.S. PATENT DOCUMENTS

| 4,153,225 | A |   | 5/1979  | Paulsen       |           |
|-----------|---|---|---------|---------------|-----------|
| 4,648,570 | A | * | 3/1987  | Abdelmaseh    | B64C 1/22 |
|           |   |   |         |               | 244/117 R |
| 4,786,202 | A |   | 11/1988 | Arnold et al. |           |
| 5,086,996 | A | * | 2/1992  | Roeder        | B64C 1/061 |
|           |   |   |         |               | 244/118.5 |
| 6,837,010 | B2 | * | 1/2005 | Powell        | E04H 9/02 |
|           |    |   |        |               | 403/174   |
| 7,775,478 | B2 | * | 8/2010 | Wood          | B64C 1/068 |
|           |    |   |        |               | 244/119   |
| 7,861,970 | B2 | * | 1/2011 | Griess        | B64C 1/068 |
|           |    |   |        |               | 244/119   |
| 8,205,832 | B2 | * | 6/2012 | Schroeer      | B64C 1/06 |
|           |    |   |        |               | 244/119   |

(Continued)

FOREIGN PATENT DOCUMENTS

| CN | 102991665    | 3/2013  |
| DE | 102009020891 | 11/2010 |

(Continued)

OTHER PUBLICATIONS

European Patent Application No. 15193650.7; Extended Search Report; dated Apr. 13, 2016; 7 pages.

(Continued)

*Primary Examiner* — Brian M O'Hara
*Assistant Examiner* — Keith L Dixon
(74) *Attorney, Agent, or Firm* — Gates & Cooper LLP

(57) ABSTRACT

A fuselage portion of a vehicle (e.g., an aircraft) is disclosed. The fuselage portion comprises a frame; a floor beam attached to the frame and comprising ends; a structural stanchion comprising a first end and a second end; a first structural coupling joining the first end of the structural stanchion and the floor beam; a second structural coupling joining the second end of the structural stanchion and the frame; a non-structural stanchion comprising a third end and a fourth end; a first non-structural coupling joining the third end of the non-structural stanchion and the floor beam; and a second non-structural coupling joining the fourth end of the non-structural stanchion and the frame.

23 Claims, 13 Drawing Sheets

(56) References Cited

U.S. PATENT DOCUMENTS

| | | | | |
|---|---|---|---|---|
| 8,403,261 | B2* | 3/2013 | Delahaye | B64F 5/0009 |
| | | | | 244/118.5 |
| 8,894,010 | B2* | 11/2014 | Delahaye | B64C 1/068 |
| | | | | 244/119 |
| 2008/0093503 | A1* | 4/2008 | Cacciaguerra | B64C 1/061 |
| | | | | 244/119 |
| 2008/0217478 | A1* | 9/2008 | Keeler | B64C 1/18 |
| | | | | 244/119 |
| 2010/0044510 | A1* | 2/2010 | Schroeer | B64C 1/06 |
| | | | | 244/119 |
| 2011/0001006 | A1 | 1/2011 | Delahaye et al. | |

FOREIGN PATENT DOCUMENTS

| | | |
|---|---|---|
| DE | 102009020891 A1 | 11/2010 |
| FR | 2975372 A1 | 11/2012 |
| JP | 2009-534251 | 9/2009 |
| WO | WO 2007/057411 A1 | 5/2007 |
| WO | 2007/122246 | 11/2007 |
| WO | 2011127899 | 10/2011 |
| WO | WO 2011/127899 A2 | 10/2011 |
| WO | WO 2013/135855 A1 | 9/2013 |

OTHER PUBLICATIONS

Japanese Notice of Reasons for Rejection dated May 27, 2019 for Japanese Patent Application No. 2015-123663.
Extended European Search Report dated Mar. 4, 2019 for European Patent Application No. 18204153.3.
Chinese Office Action dated Jun. 27, 2018 for CN Application No. 2015107565214.
Chinese Office Action dated Dec. 27, 2018 for CN Application No. 2015107565214.
Japanese Office Action dated Nov. 5, 2019 for JP Application No. 2015-123663.

* cited by examiner

FUSELAGE WITH STRUCTURAL AND NON-STRUCTURAL STANCHIONS

BACKGROUND

Many commercially available aircraft include floor beams extending between opposite sides of the fuselage and attached to the frames of the fuselage. The floor beams support the floor of the passenger compartment and/or the upper cargo compartment. In some designs, vertical stanchions, permanently attached between the floor beams and the frames, provide structural support for the floor beam. However, these stanchions can present difficulties with the installation of various system runs, such as wire bundles, hydraulic lines, air-conditioning ducts, and the like. Other fuselage designs utilize deep floor beams and locally reinforced frames to achieve the requisite structural stability without using stanchions to support the floor beams. However, this approach decreases the space available in the passenger cabin and/or the cargo compartment.

SUMMARY

Accordingly, apparatuses and methods, intended to address the above-identified concerns, would find utility.

The following is a non-exhaustive list of examples, which may or may not be claimed, of the subject matter according the present disclosure.

One example of the present disclosure relates to a fuselage portion. The fuselage portion comprises a frame; a floor beam attached to the frame and comprising ends; a structural stanchion comprising a first end and a second end; a first structural coupling joining the first end of the structural stanchion and the floor beam; a second structural coupling joining the second end of the structural stanchion and the frame; a non-structural stanchion comprising a third end and a fourth end; a first non-structural coupling joining the third end of the non-structural stanchion and the floor beam; and a second non-structural coupling joining the fourth end of the non-structural stanchion and the frame.

Another example of the present disclosure relates to a vehicle comprising a fuselage portion. The fuselage portion of the vehicle comprises frames; floor beams attached to frames and each comprising ends; structural stanchions comprising first ends and second ends; first structural couplings joining the first ends of the structural stanchions and the floor beams; second structural couplings joining the second ends of the structural stanchions and frames; non-structural stanchions comprising third ends and fourth ends; first non-structural couplings joining the third ends of the non-structural stanchions and the floor beams; and second non-structural couplings joining the fourth ends of the non-structural stanchions and the frames.

Yet another example of the present disclosure relates to a method of manufacturing a fuselage portion. The method comprises structurally attaching a floor beam to a frame, wherein the floor beam comprises ends; installing a structural stanchion by structurally attaching a first end of the structural stanchion to the floor beam and the second end of the structural stanchion to the frame; and installing a non-structural stanchion by non-structurally attaching a third end of the non-structural stanchion to the floor beam and the fourth end of the non-structural stanchion to the frame.

BRIEF DESCRIPTION OF THE DRAWINGS

Figure 1:
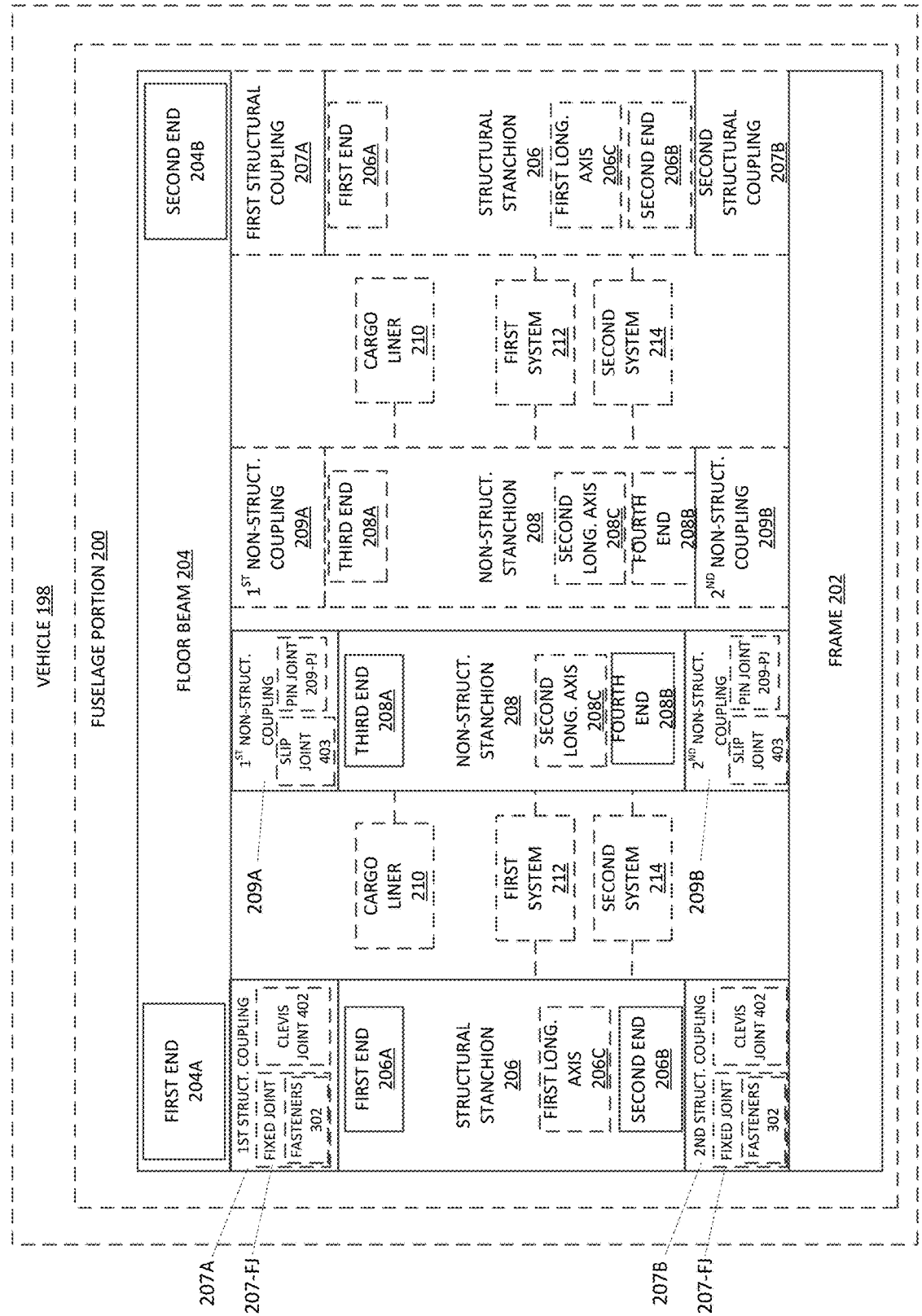
Figure 2:
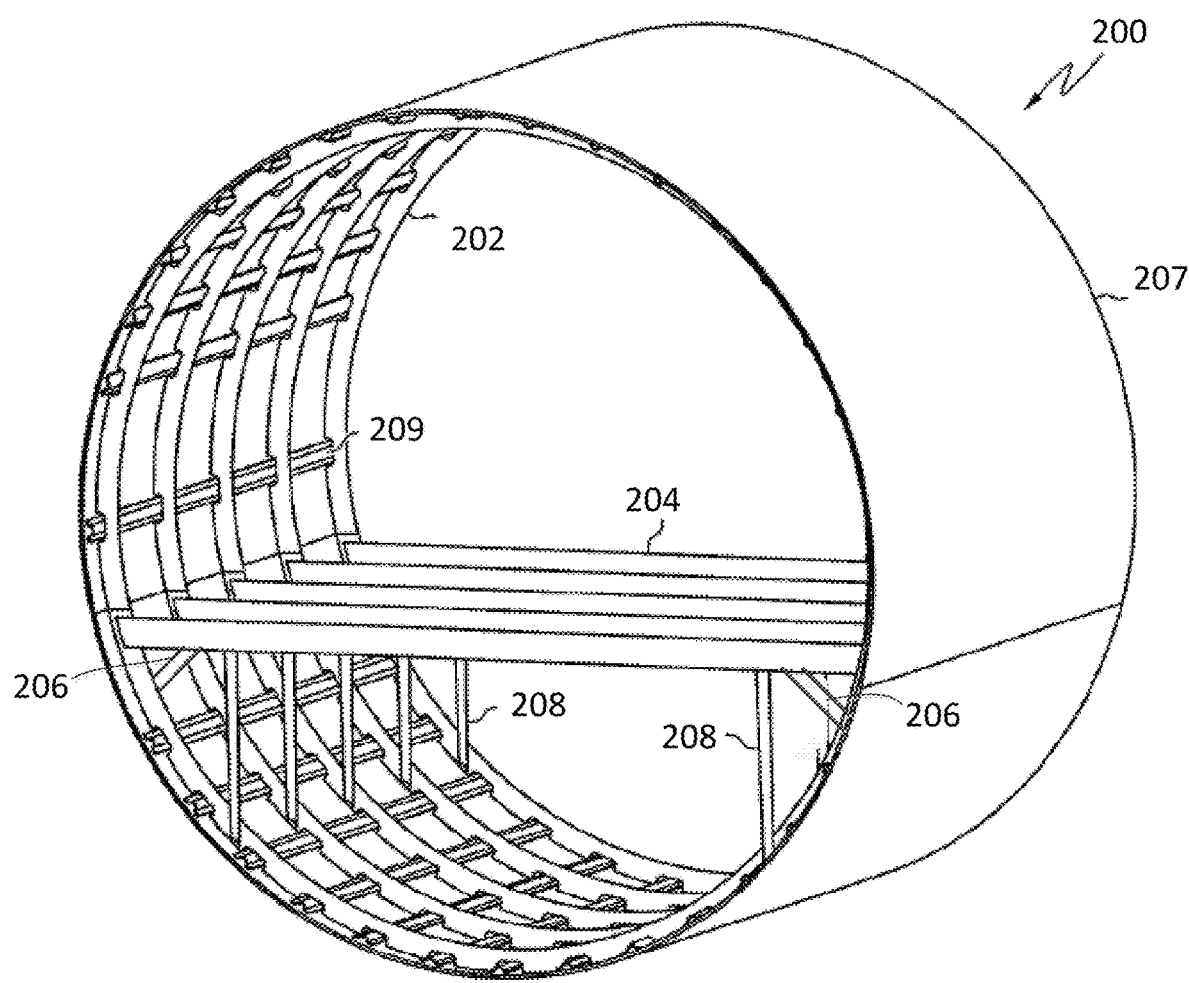

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a fuselage portion of a vehicle, according to one or more examples of the present disclosure;

FIG. 2 is a perspective view of the fuselage portion of FIG. 1, according to one or more examples of the present disclosure.

Figure 3:
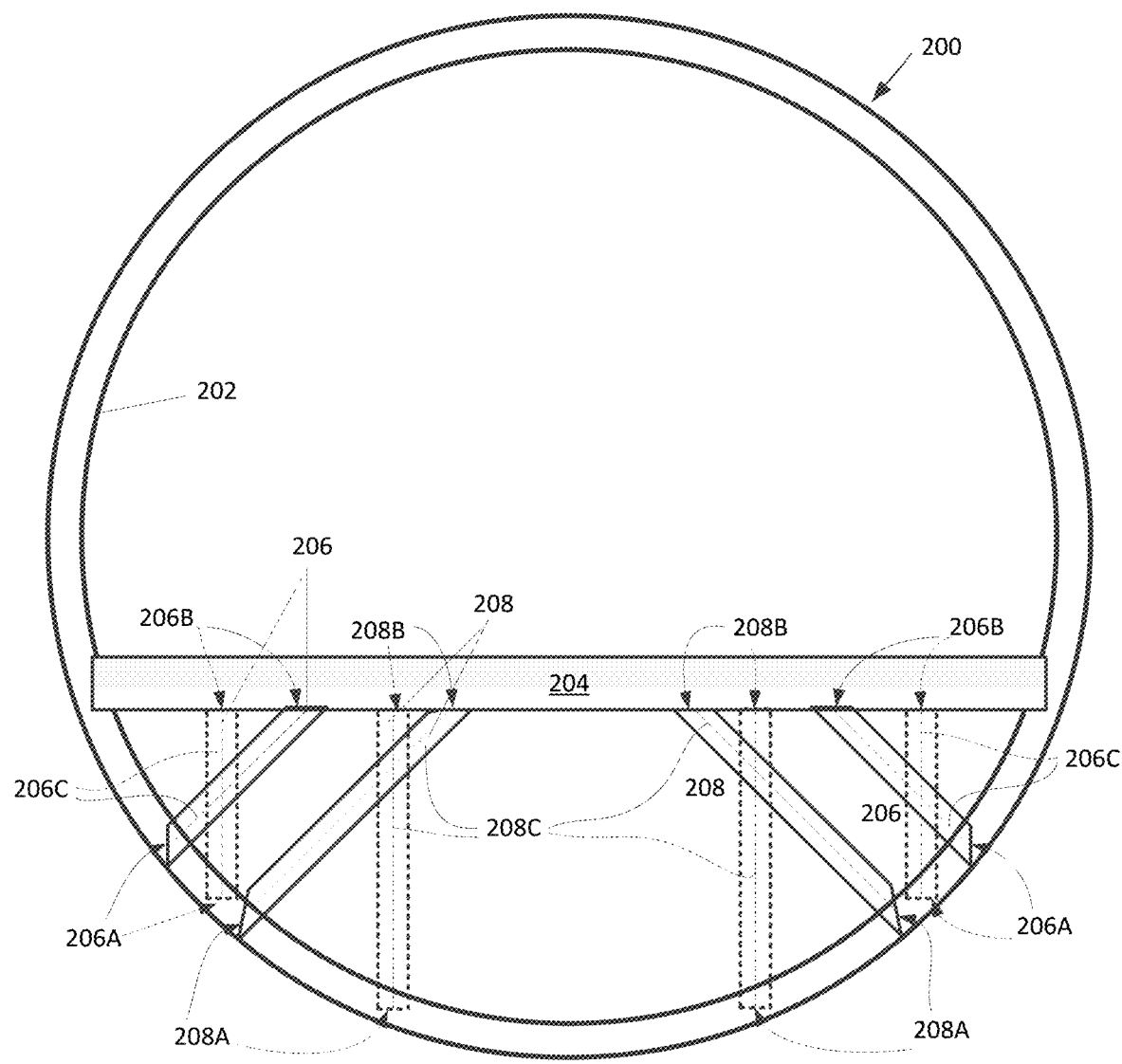
Figure 3A:
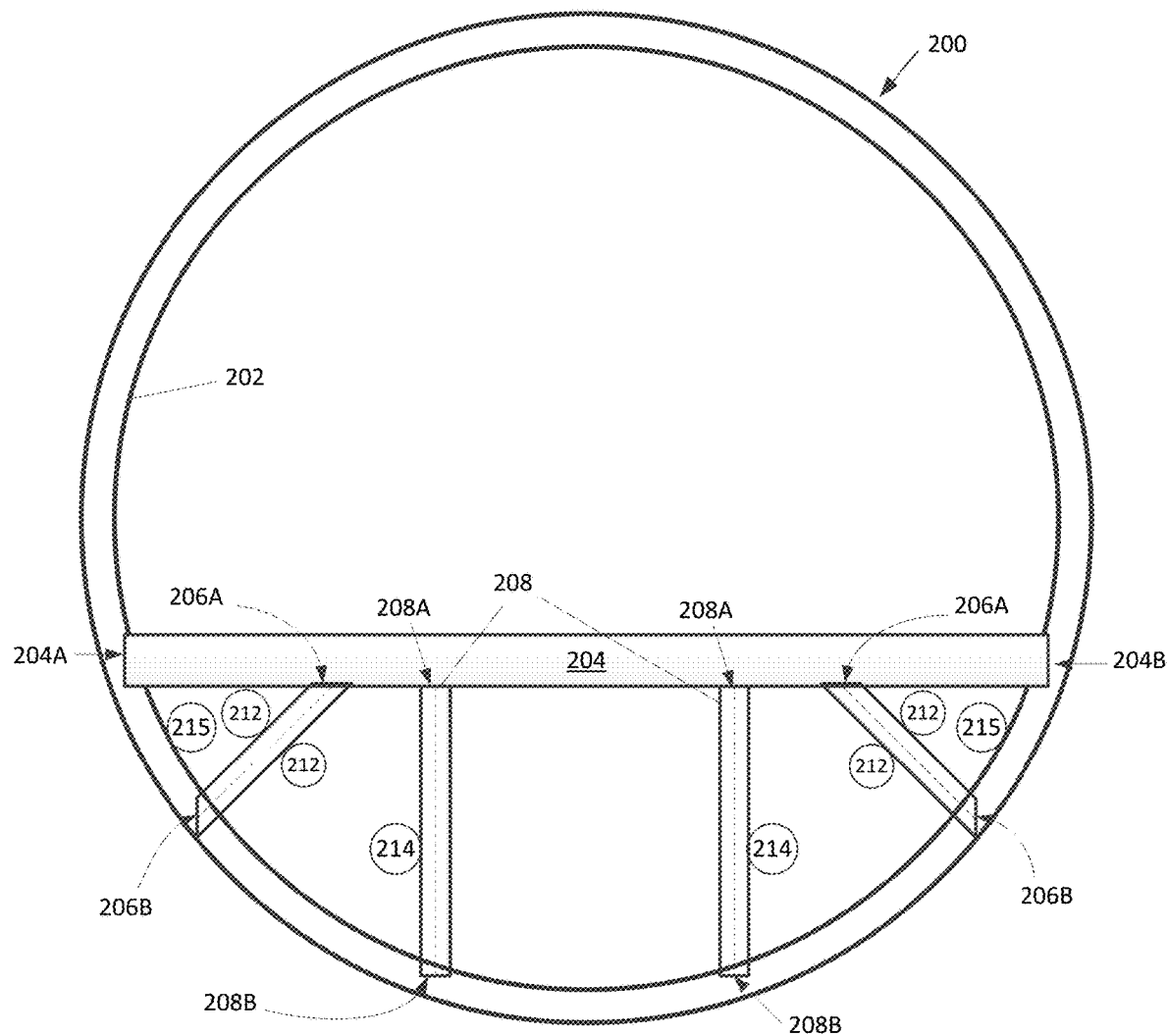
Figure 4A:
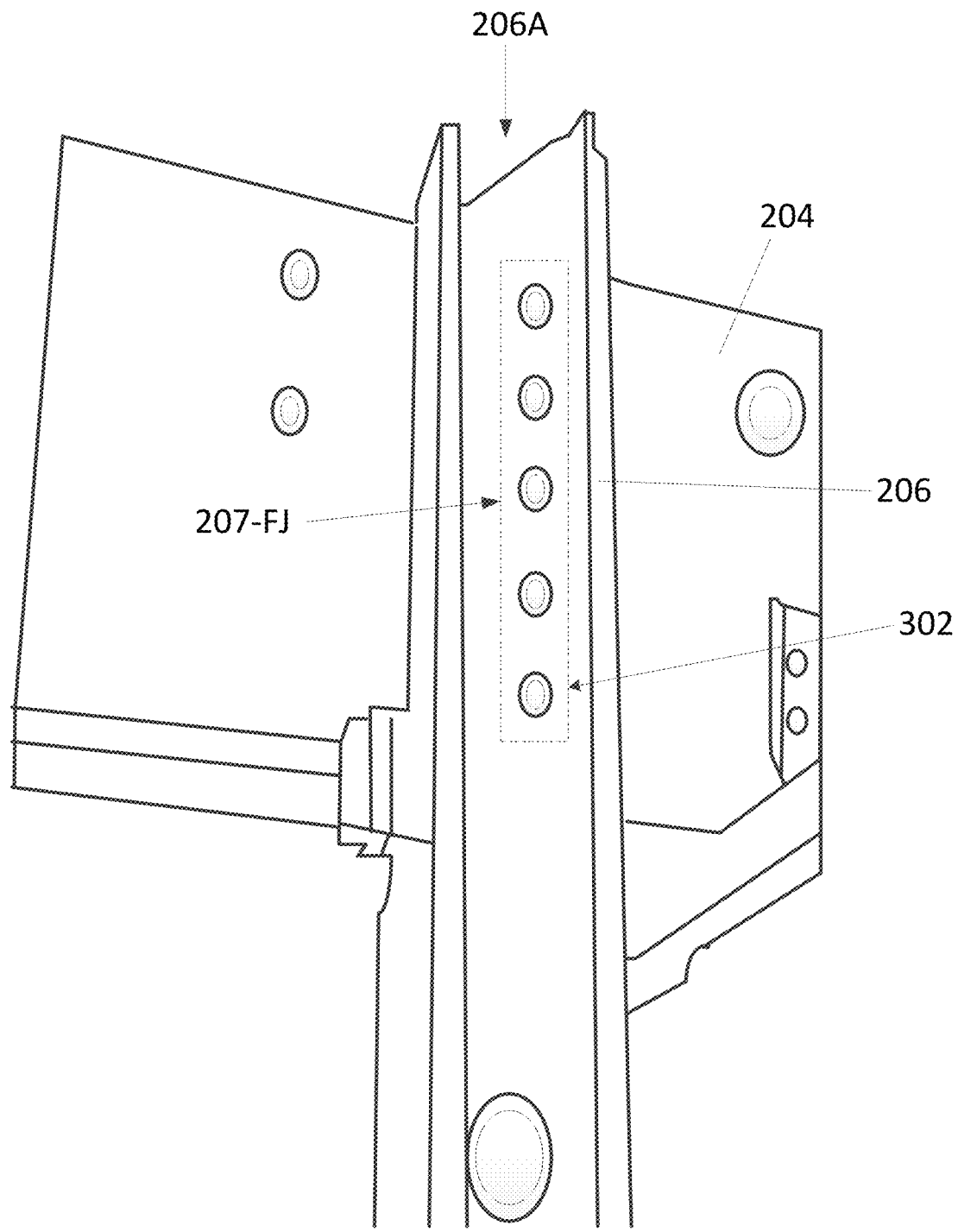
Figure 4B:
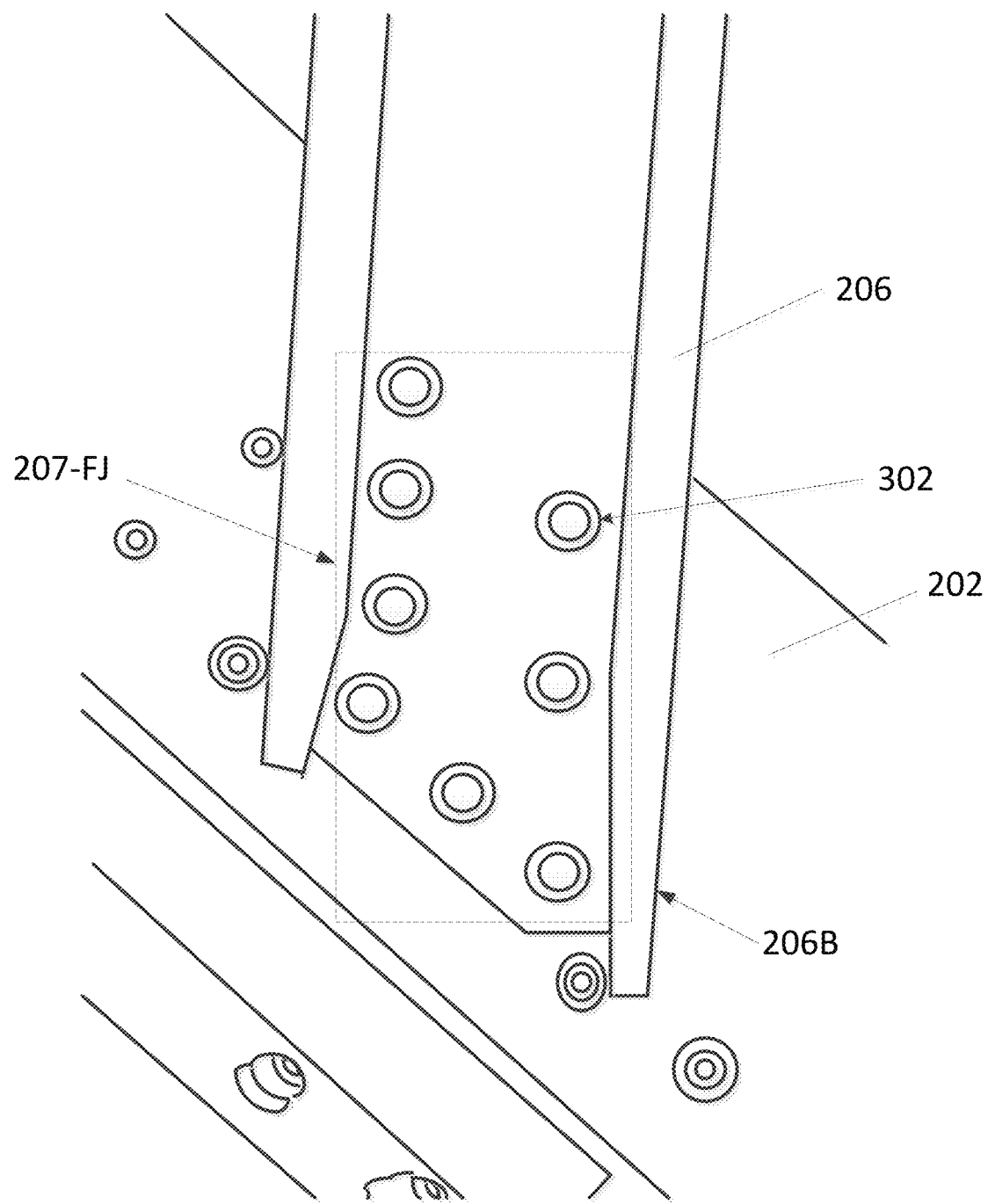
Figure 5A:
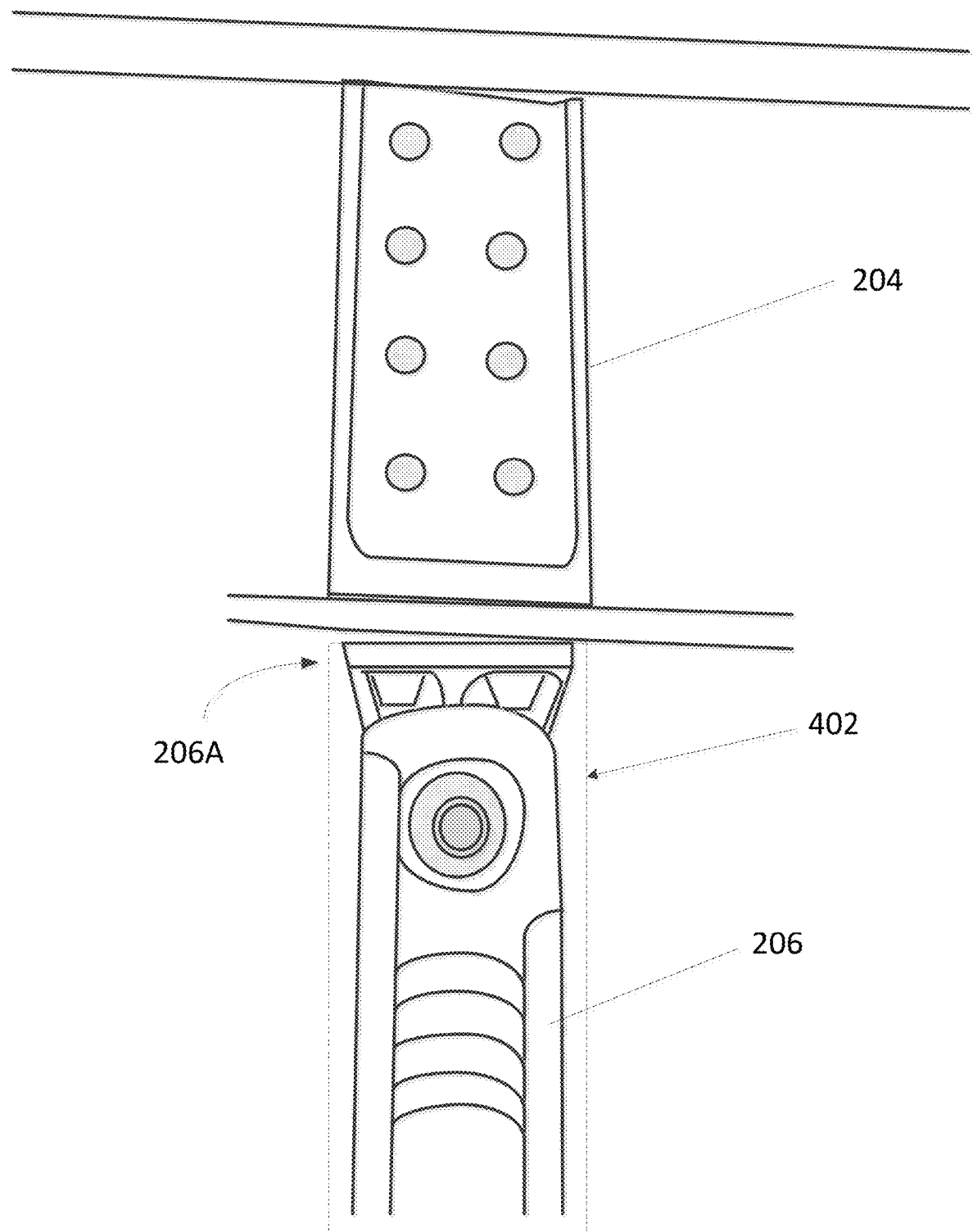
Figure 5B:
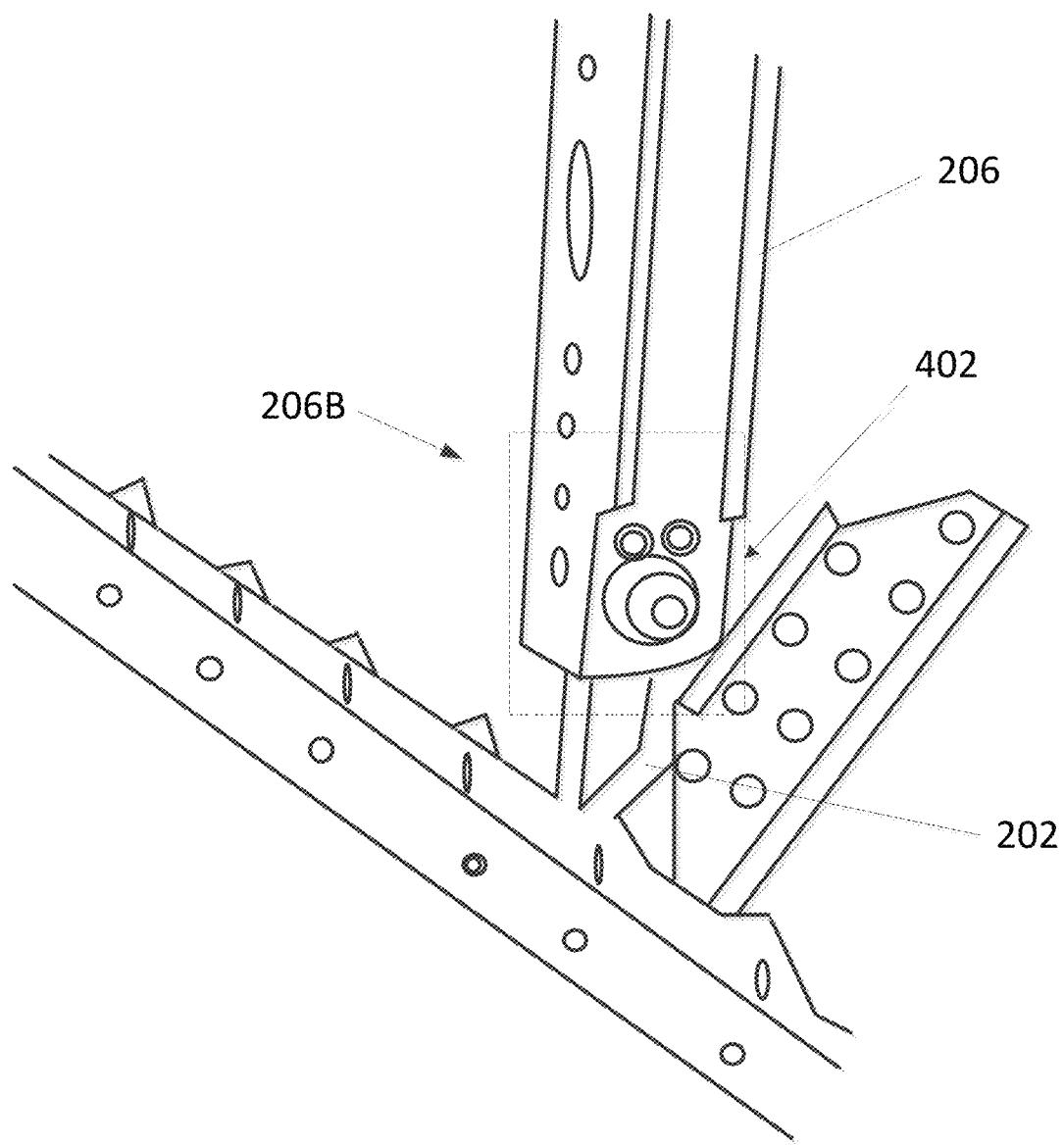
Figure 6A:
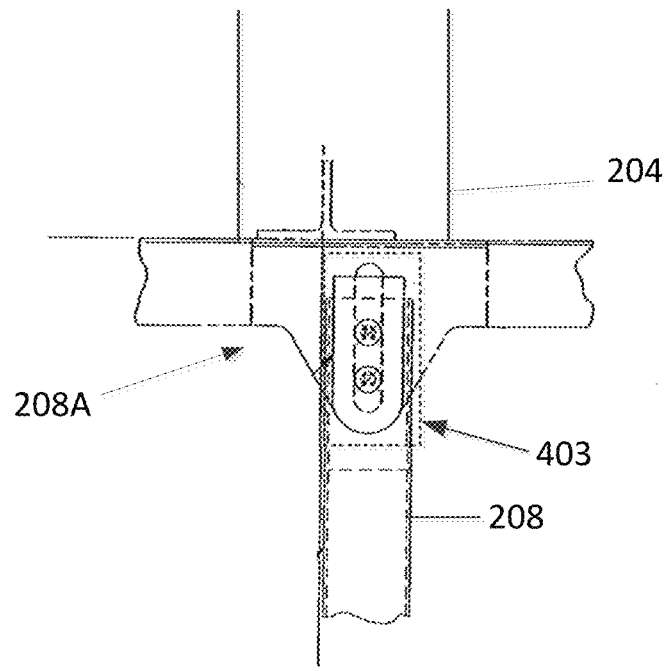
Figure 6B:
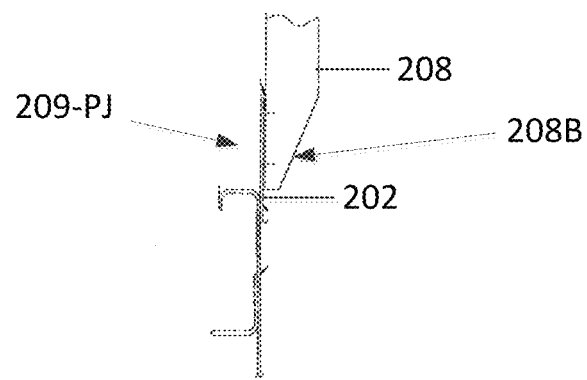
Figure 7A:
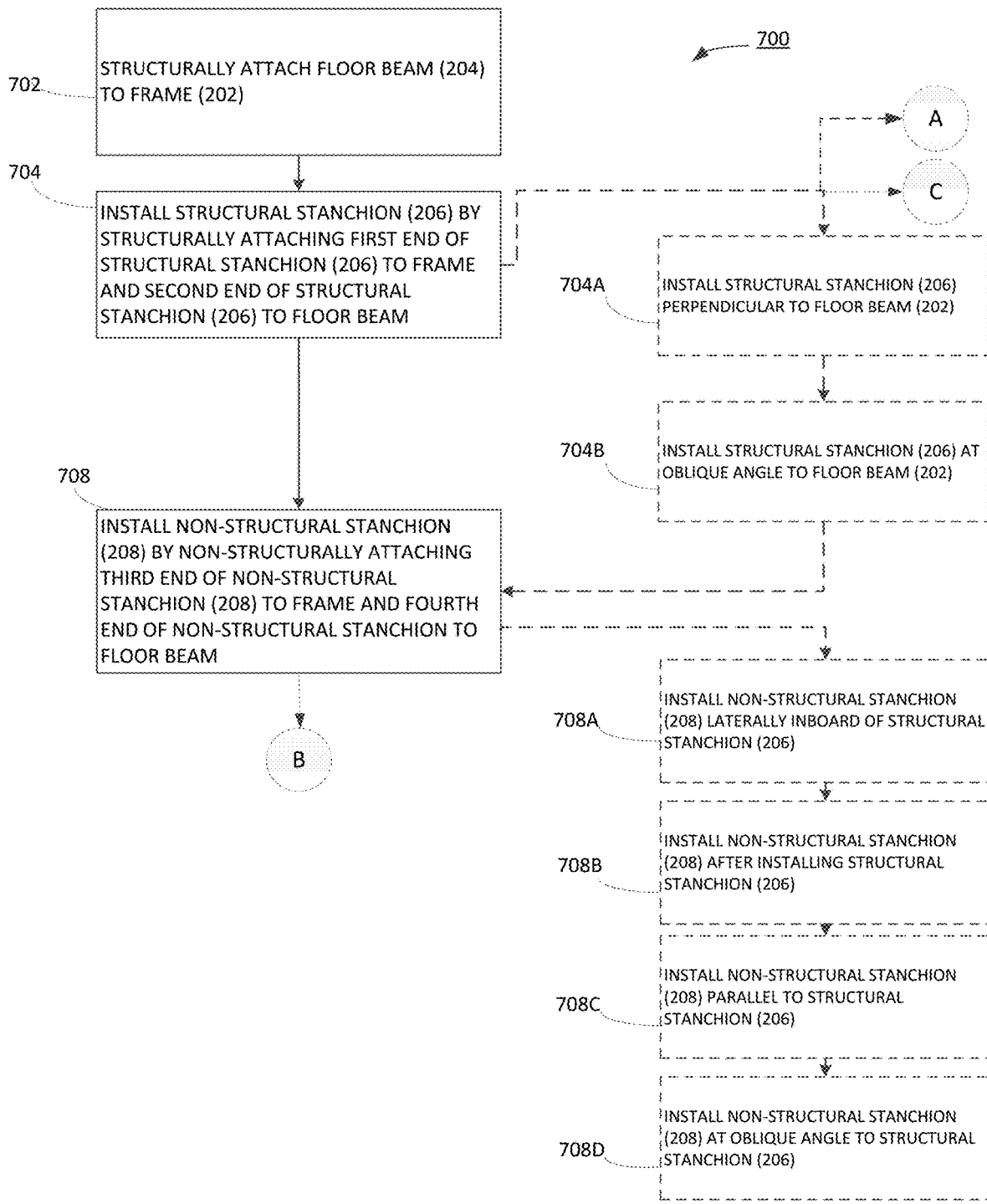
Figure 7B:
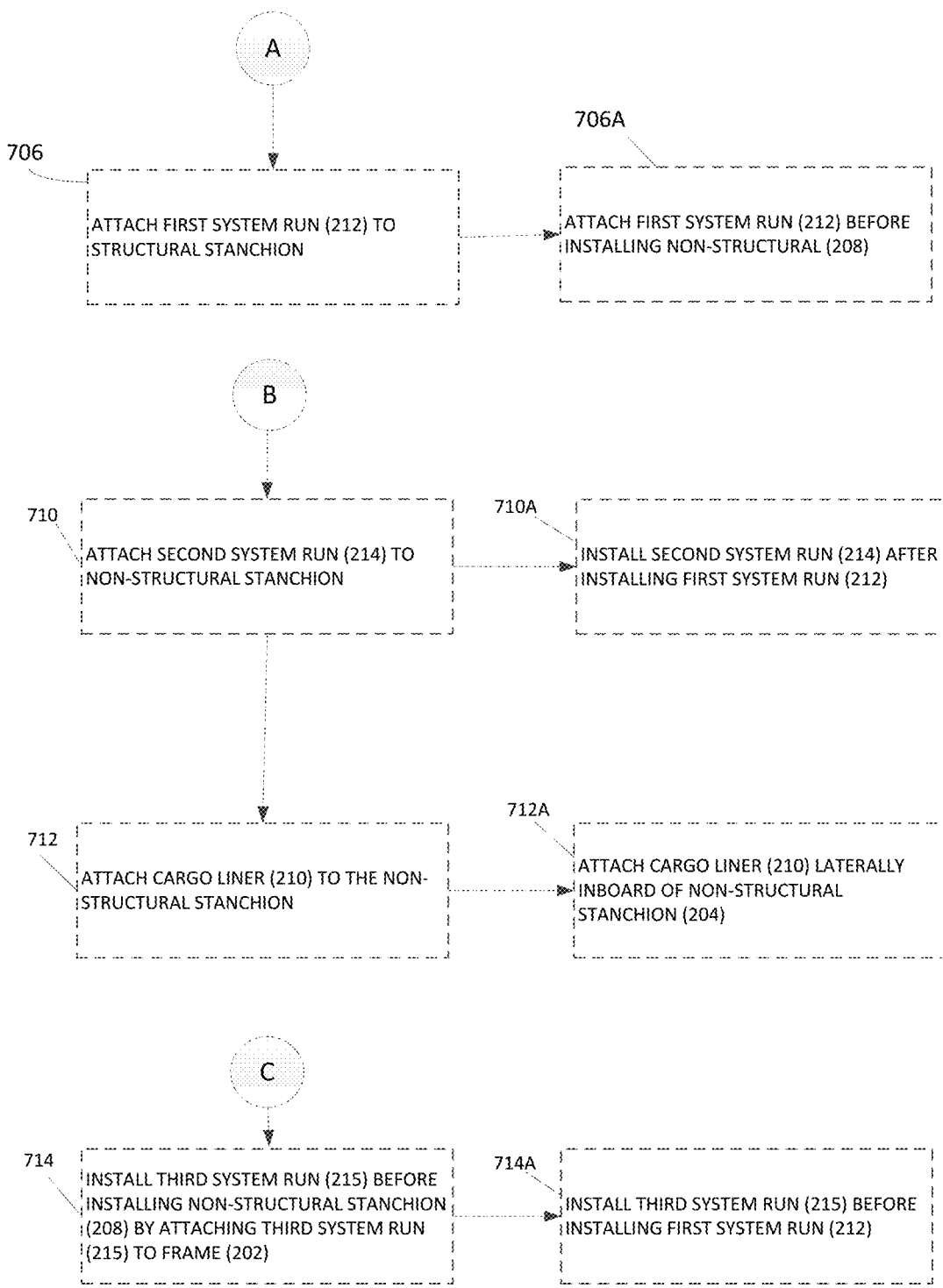
Figure 8:
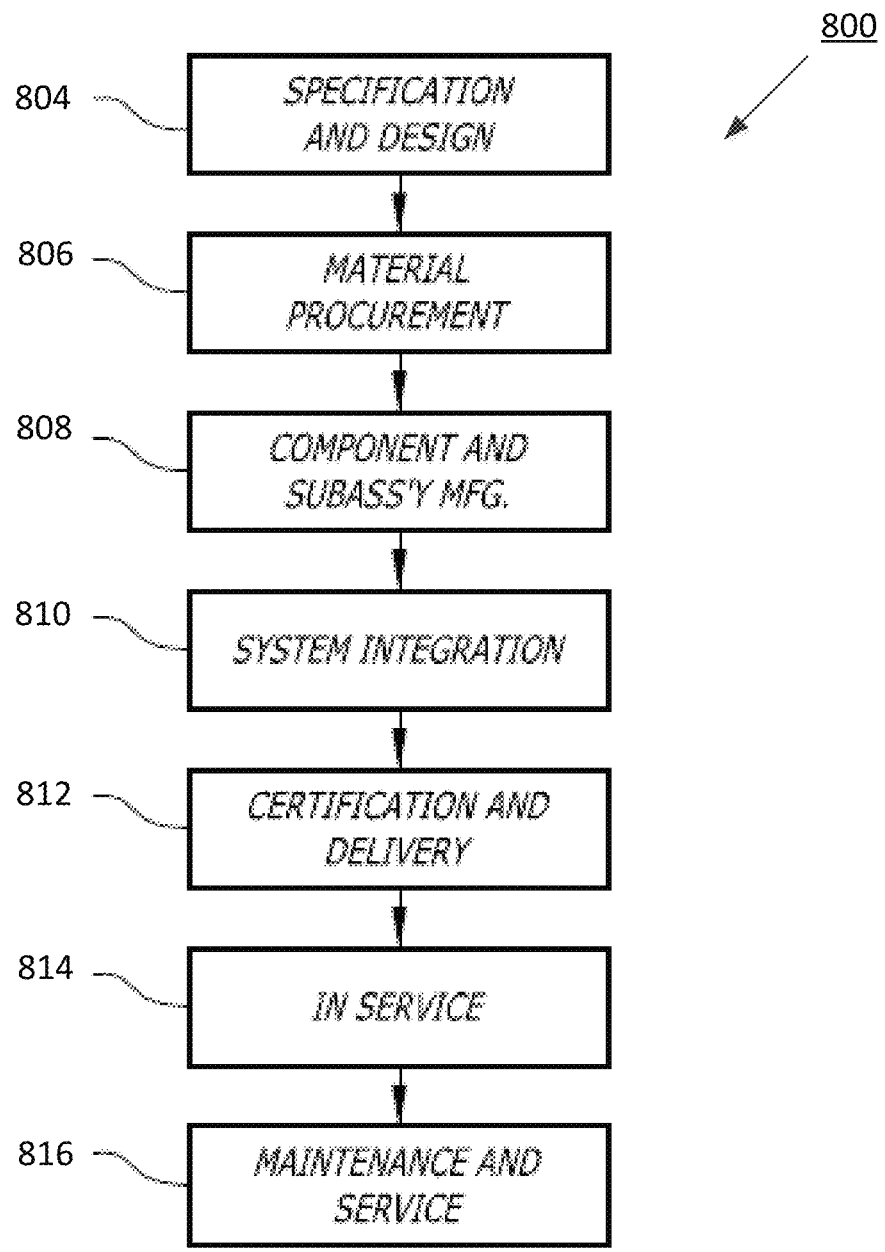

FIG. 3 is a schematic end view of the fuselage portion of FIG. 1, according to one or more examples of the present disclosure;

FIG. 3A is a schematic end view of the fuselage portion of FIG. 1, according to one or more examples of the present disclosure;

FIG. 4A is a schematic illustration of a detail of the fuselage portion of FIG. 1, showing a structural coupling of a stanchion to a floor beam, according to one or more examples of the present disclosure;

FIG. 4B is a schematic illustration of a detail of the fuselage portion of FIG. 1, showing a structural coupling of a stanchion to a frame, according to one or more examples of the present disclosure;

FIG. 5A is a schematic illustration of a detail of the fuselage portion of FIG. 1, showing a structural coupling of a stanchion to a floor beam, according to one or more examples of the present disclosure;

FIG. 5B is a schematic illustration of a detail of the fuselage portion of FIG. 1, showing a structural coupling of a stanchion to a frame, according to one or more examples of the present disclosure;

FIG. 6A is a schematic illustration of a detail of the fuselage portion of FIG. 1, showing a non-structural coupling of a stanchion to a floor beam, according to one or more examples of the present disclosure;

FIG. 6B is a schematic illustration of a detail of the fuselage portion of FIG. 1, showing a non-structural coupling of a stanchion to a frame, according to one or more examples of the present disclosure;

FIGS. 7A and 7B are a block diagram of a method of manufacturing a fuselage portion, according to one or more examples of the present disclosure;

FIG. 8 is a block diagram of aircraft production and service methodology; and

Figure 9:
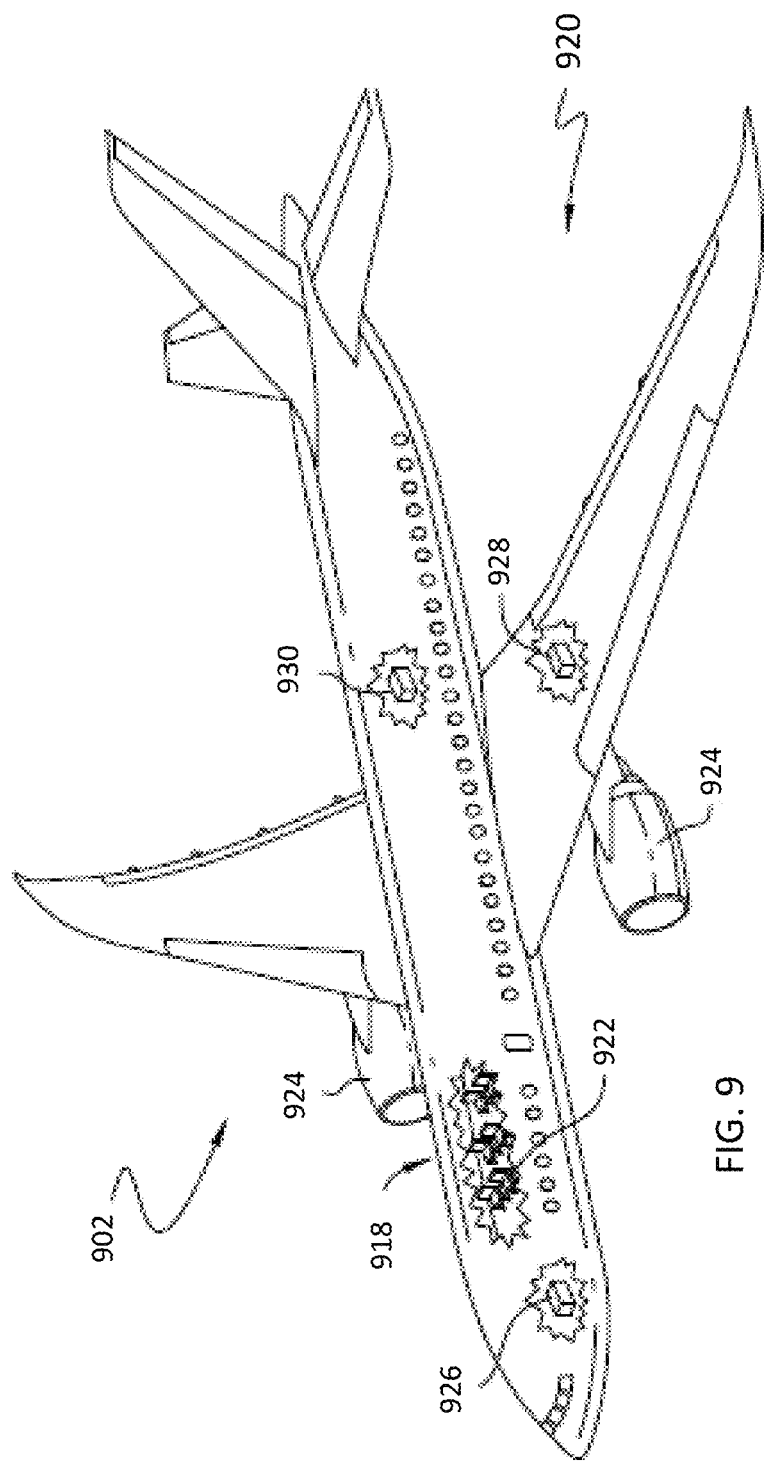

FIG. 9 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual imaginary elements may also be shown for clarity. Those skilled in the art will appreciate that some of the features illustrated in FIG. 1 be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 1, 7A, 7B and 8, referred to above, the blocks may represent operations and/or portions thereof and lines connecting the various blocks do not imply any particular order or dependency of the operations or portions thereof. FIGS. 1, 7A, 7B and 8 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring e.g., to FIGS. 1, 2, 3, and 3A, the instant paragraph pertains to example 1 of the present disclosure. According to example 1, fuselage portion 200 comprises: frame 202; floor beam 204 attached to frame 202 and comprising ends 204A and 204B; structural stanchion 206, comprising first end 206A and second end 206B; first structural coupling 207A joining first end 206A of structural stanchion 206 and floor beam 204; second structural coupling 207B joining second end 206B of structural stanchion 206 and frame 202; non-structural stanchion 208 comprising third end 208A and fourth end 208B; first non-structural coupling 209A joining third end 208A of non-structural stanchion 208 and floor beam 204; and second non-structural coupling 209B joining fourth end 208B of non-structural stanchion 208 and frame 202.

The disclosed arrangement of structural stanchions 206 and non-structural stanchions 208 in respect to frames 202 and floor beam(s) 204 facilitates installation of cargo liner 210 and various systems 212, 214, 215. The disclosed arrangement, e.g., enables systems runs to be quickly and efficiently installed in the fuselage cheeks outboard of the structural floor stanchions (see FIG. 3A), with other systems and cargo liner installed inboard of the structural stanchions (see FIGS. 1 and 3A). The disclosed arrangement does not require deep floor beams and deep frames at the floor, thus increasing available passenger space.

Referring generally to FIG. 1, the instant paragraph pertains to example 2 of the present disclosure. According to example 2, which includes the subject matter of example 1, above, structural stanchion 206 is capable of supporting a first load; non-structural stanchion 208 is capable of supporting a second load; and the first load is greater than the second load.

For example, structural stanchions 206 may be designed to support substantially all the load of floor beam(s) 204 such that non-structural stanchions 208 do not bear any load of floor beam(s) 204. This feature of the structural and non-structural stanchions means that non-structural stanchions 208 can be more easily and efficiently installed or uninstalled to accommodate the installation of cargo liner 210 and systems 212, 214, 215.

Referring generally to FIGS. 1, 2, 3, 3A, and 7, the instant paragraph pertains to example 3 of the present disclosure. According to example 3, which includes the subject matter of any of examples 1 and 2, above, non-structural stanchion 208 is laterally inboard of structural stanchion 206 relative to ends 204A and 204B of floor beam 204.

This feature facilitates the manufacturing process since it enables cargo liner 210 and systems 212, 214, 215 to be more efficiently installed after structural stanchions 206 supporting floor beam(s) 204 are installed Moreover, structural stanchion 206 located outboard the non-structural stanchion 208 has a relatively short length, promoting weight savings.

Referring generally to FIGS. 1 and 3A, the instant paragraph pertains to example 4 of the present disclosure. According to example 4, which includes the subject matter of any of examples 1-3, above, fuselage portion 200 further comprises cargo liner 210, attached to non-structural stanchion 208, and first system run 212, attached to structural stanchion 206.

Referring generally to FIGS. 1 and 3A, the instant paragraph pertains to example 5 of the present disclosure. According to example 5, which includes the subject matter of example 4, above, fuselage portion 200 further comprises second system run 214, attached to non-structural stanchion 208.

Referring generally to FIGS. 1 and 3A, the instant paragraph pertains to example 6 of the present disclosure. According to example 6, which includes the subject matter of any of examples 4 and 5, above, fuselage portion 200 further comprises third system run 215 attached to frame 202.

In regard to examples 4-6, cargo liner 210 may be fabricated from a fire-resistant material (e.g., woven fiberglass cloth) with a high strength-to-weight ratio, making it suitable for use as cargo or baggage bay lining. Moreover, any one of system runs 212, 214, 215 may be a portion of any one of a number of aircraft systems, including a propulsion system, electrical system, hydraulic system, and environmental system. Any number of other systems may be included as well. By attaching first system run 212 to structural stanchion 206, and attaching cargo liner 210 to non-structural stanchion 208, the systems and stanchions may be installed more efficiently since system run 212 may be installed first, i.e., without interference from non-structural stanchion 208 and cargo liner 210.

Referring generally to FIGS. 1 and 3, the instant paragraph pertains to example 7 of the present disclosure. According to example 7, which includes the subject matter of any of examples 1-6, above, non-structural stanchion 208 is parallel to structural stanchion 206.

Referring generally to FIGS. 1 and 3, the instant paragraph pertains to example 8 of the present disclosure. According to example 8, which includes the subject matter of any of examples 1-6, above, non-structural stanchion 208 is oblique to structural stanchion 206.

With regard to examples 7 and 8, by enabling non-structural stanchion 208 to be either parallel to structural stanchion 206, or alternatively oblique to structural stanchion 206, flexibility in terms of the number of configurations that are available for improving space utilization within the area of fuselage portion 200 underneath floor beam(s) 204, i.e., for systems and cargo, in enhanced.

Referring generally to FIGS. 1, 2, 3, and 3A, the instant paragraph pertains to example 9 of the present disclosure. According to example 9, which includes the subject matter of any of examples 1-8, above, structural stanchion 206 is perpendicular to floor beam 204.

Referring generally to FIGS. 1, 2, 3, and 3A, the instant paragraph pertains to example 10 of the present disclosure. According to example 10, which includes the subject matter of any of examples 1-8, above, structural stanchion 206 is oblique to floor beam 204.

In regard to examples 9 and 10, by arranging structural stanchions 206 perpendicular to floor beam(s) 204, it is possible to increase the vertical load bearing capacity of the structural stanchions, particularly depending on how far inboard of ends 204A, 204B of floor beam(s) 204 the stanchions are installed. On the other hand, if the structural stanchion in installed close to the end of a floor beam (in the outboard direction), it may be advantageous for the structural stanchion to be at an oblique angle relative to the floor beam(s) (see FIG. 3). The angular relationship of the structural stanchions to the floor beam(s) can also affect the amount of available space under floor beam(s) 204 for systems and cargo.

Referring generally to FIGS. 1, 2, 3, and 3A, the instant paragraph pertains to example 11 of the present disclosure. According to example 11, which includes the subject matter of any of examples 1-8, above, non-structural stanchion 208 is perpendicular to floor beam 204.

Referring generally to FIGS. 1, 2, 3, and 3A, the instant paragraph pertains to example 12 of the present disclosure. According to example 12, which includes the subject matter of any of examples 1-8, above, non-structural stanchion 208 is oblique to floor beam 204.

The angular relationship of the non-structural stanchions to the floor beam(s) may be selected to increase the amount of available space under floor beam(s) 204 for systems and cargo.

Referring generally to FIGS. 1, 2, and 3, the instant paragraph pertains to example 13 of the present disclosure. According to example 13, which includes the subject matter of any of examples 1-12, above, frame 202 has a substantially uniform depth D.

The configuration of structural and non-structural stanchions arranged as described herein means that frame 202 is not required to be thicker or deeper in areas where the stanchions are coupled to the frame.

Referring generally to FIGS. 1, 2, and 3, the instant paragraph pertains to example 14 of the present disclosure.
According to example 14, which includes the subject matter of any of examples 1-13, above, frame 202 is not locally reinforced next to floor beam 204.

The configuration of structural and non-structural stanchions arranged as described herein means that frame 202 is not required to be locally reinforced for attachment of the floor beam, which means that passenger space can be enhanced in the outboard areas of the fuselage.

Referring generally to FIGS. 1 and 3A, and more specifically to FIGS. 4A, 4B, 5A, and 5B, the instant paragraph pertains to example 15 of the present disclosure. According to example 15, which includes the subject matter of any of examples 1-14, above, at least one of first structural coupling 207A between first end 206A of structural stanchion 206 and floor beam 204 or second structural coupling 207B between second end 206B of structural stanchion 206 and frame 202 comprises fixed joint 207-FJ.

Fixed joint 207-FJ provides sufficient strength to enable structural stanchions 206 to fully support the load of floor beam(s) 204. Since non-structural stanchions 208 do not bear structural load, the non-structural stanchions can be installed later in the manufacturing process, i.e., so that various systems located outboard of the non-structural stanchions can be installed before the non-structural stanchions are installed.

Referring generally to FIG. 1 and more specifically to FIGS. 4A and 4B, the instant paragraph pertains to example 16 of the present disclosure. According to example 16, which includes the subject matter of example 15, above, fixed joint 207-FJ comprises fasteners 302.

Referring generally to FIG. 1 and more specifically to FIGS. 4A and 4B, the instant paragraph pertains to example 17 of the present disclosure. According to example 17, which includes the subject matter of example 16, above, fasteners 302 have an interference fit with structural stanchion 206 and at least one of floor beam 204 or frame 202.

In regard to examples, 16 and 17, fixed joint 207-FJ may be implemented with relatively inexpensive standard parts such as bolts or similar hardware elements that provide a sufficiently firm coupling, including providing an interference fit with structural stanchion 206 and floor beam(s) 204 or frame 202. Such elements provide the required structural coupling for supporting the load of the floor beam(s).

Referring generally to FIGS. 1, 2, 3, and 3A, and more specifically to FIGS. 4A, 4B, 5A, and 5B, the instant paragraph pertains to example 18 of the present disclosure. According to example 18, which includes the subject matter of any of examples 1-14, above, at least one of first structural coupling 207A between first end 206A of structural stanchion 206 and floor beam 204 or second structural coupling 207B between second end 206B of structural stanchion 206 and frame 202 comprises a pinned clevis joint 402.

The pinned clevis joint 402 allows the length of the stanchion to be adjusted as necessary due to bending of the floor beam 204 or frame length 202, which facilitates the efficient installation of system runs. The pinned clevis joint 402 also allows for rotation in some axes while restricting rotation in others. This allows structural stanchions 206 to be installed at an oblique angle to frame 202 or floor beam(s) 204.

Referring generally to FIGS. 1, 2, 3, 3A, 4A, 4B, 5A, and 5B, and more specifically to FIGS. 6A and 6B, the instant paragraph pertains to example 19 of the present disclosure. According to example 19, which includes the subject matter of any of examples 1-18, above, at least one of first non-structural coupling 209A between third end 208A of non-structural stanchion 208 and floor beam 204 or second non-structural coupling 209B between fourth end 208B of non-structural stanchion 208 and frame 202 comprises slip joint 403.

A slip joint is a mechanical construction allowing extension and compression in a linear structure. One advantage of using a slip joint in the manner disclosed is that non-structural couplings 209A and 209B can be adjusted in length to facilitate the efficient installation and removal of non-structural stanchion 208.

Referring generally to FIGS. 1, 2, 3, 3A, 4A, 4B, 5A, and 5B, and more specifically to FIGS. 6A and 6B, the instant paragraph pertains to example 20 of the present disclosure. According to example 20, which includes the subject matter of any of examples 1-19, above, at least one of first non-structural coupling 209A between third end 208A of non-structural stanchion 208 and floor beam 204 or second non-structural coupling 209B between fourth end 208B of non-structural stanchion 208 and frame 202 comprises a pin joint 209-PJ.

A pin joint (also called a revolute joint or hinge joint) is a one-degree-of-freedom kinematic pair used in mechanisms to provide a single-axis rotation function. One advantage of using a pin joint in the manner disclosed is that non-structural couplings 209A and 209B can be installed at an oblique angle to frame 202 or floor beam(s) 204.

Referring generally to FIGS. 1, 2, 3, 3A, 4A, 4B, 5A, and 5B, the instant paragraph pertains to example 21 of the present disclosure. According to example 21, which includes the subject matter of any of examples 1-18, above, at least one of first non-structural coupling 209A between third end 208A of non-structural stanchion 208 and floor beam 204 or second non-structural coupling 209B between fourth end 208B of non-structural stanchion 208 and frame 202 comprises a hook-and-loop coupling.

A hook-and-loop coupling, or hook-and-loop fastener is easy to use and facilitates quick installation of non-structural stanchions 208.

Referring generally to FIGS. 1, 2, 3, 3A, 4A, 4B, 5A, and 5B, the instant paragraph pertains to example 22 of the present disclosure. According to example 22, which includes the subject matter of any of examples 1-18, above, at least one of first non-structural coupling 209A between third end 208A of non-structural stanchion 208 and floor beam 204 or second non-structural coupling 209B between fourth end 208B of non-structural stanchion 208 and frame 202 comprises a magnetic coupling.

A magnetic coupling, like the hook-and-loop coupling, is easy to use and facilitates quick installation of non-structural stanchions 208.

Referring e.g., to FIGS. 1, 2, 3, and 3A, the instant paragraph pertains to example 23 of the present disclosure. Example 23 relates to vehicle 198 comprising fuselage portion 200, where the fuselage portion 200 comprises: frames 202; floor beams 204 attached to frames 202 and each comprising ends 204A, 204B; structural stanchions 206, comprising first ends 206A and second ends 206B; first structural couplings 207A joining first ends 206A of structural stanchions 206 and floor beams 204; second structural couplings 207B joining second ends 206B of structural stanchions 206 and frames 202; non-structural stanchions 208, comprising third ends 208A and fourth ends 208B; first non-structural couplings 209A joining third ends 208A of non-structural stanchions 208 and floor beams 204; and second non-structural couplings 209B joining fourth ends 208B of non-structural stanchions 208 and frames 202.

As discussed above in connection with Example 1, the disclosed arrangement of structural stanchions 206 and non-structural stanchions 208 in respect to frames 202 and floor beam(s) 204 facilitates installation of cargo liner 210 and various systems 212, 214, 215. The disclosed arrangement, e.g., enables systems runs to be quickly and efficiently installed in the fuselage cheeks outboard of the structural floor stanchions (see FIG. 3A), with other systems and cargo liner installed inboard of the structural stanchions (see FIGS. 1 and 3A). The disclosed arrangement does not require the use of deep floor beams or deep frame at the floor, thus increasing available passenger space.

Referring generally to FIG. 1, the instant paragraph pertains to example 24 of the present disclosure. According to example 24, which includes the subject matter of example 23, above, each of structural stanchions 206 is capable of supporting a first load; each of non-structural stanchions 206 is capable of supporting a second load; and the first load is greater than the second load.

As discussed above, structural stanchions 206 may be designed to support substantially all the load of floor beam(s) 204 such that non-structural stanchions 208 do not bear any load of floor beam(s) 204. This feature of the structural and non-structural stanchions means that the non-structural stanchions 208 can be more easily and efficiently installed or uninstalled to accommodate the installation of cargo liner 210 and systems 212, 214, 215.

Referring generally to FIG. 1 and particularly to e.g. FIG. 3A, the instant paragraph pertains to example 25 of the present disclosure. According to example 25, which includes the subject matter of any of examples 23 and 24, above, non-structural stanchions 208 are laterally inboard of structural stanchions 206 relative to ends 204A and 204B of floor beams 204.

This feature facilitates the manufacturing process since it enables cargo liner 210 and systems 212, 214, 215 to be more efficiently installed after structural stanchions 206 supporting floor beam(s) 204 are installed Moreover, structural stanchions 206 located outboard the non-structural stanchions 208 have a relatively short length, promoting weight savings.

Referring generally to FIG. 1 and more specifically to FIG. 3A, the instant paragraph pertains to example 26 of the present disclosure. According to example 26, which includes the subject matter of any of examples 23-25, above, vehicle 198 further comprises cargo liners 210, attached to at least some of non-structural stanchions 208, and first system runs 212, attached to at least some of structural stanchions 206.

Referring generally to FIG. 1 and more specifically to FIG. 3A, the instant paragraph pertains to example 27 of the present disclosure. According to example 27, which includes the subject matter of example 26, above, vehicle 198 further comprises second system runs 214 attached to at least some of non-structural stanchions 208.

Referring generally to FIG. 1 and more specifically to FIG. 3A, the instant paragraph pertains to example 28 of the present disclosure. According to example 28, which includes the subject matter of any of examples 26 and 27, above, vehicle 198 further comprises third system runs 215 attached to at least some of frames 202.

In regard to examples 26-28, cargo liner 210 may be fabricated from a fire-resistant material (e.g., woven fiberglass cloth) with a high strength-to-weight ratio, making it suitable for use as cargo or baggage bay lining. Moreover, any one of system runs 212, 214, 215 may be a portion of any one of a number of aircraft systems, including a propulsion system, electrical system, hydraulic system, and environmental system. Any number of other systems may be included as well. By attaching first system run 212 to structural stanchions 206, and attaching cargo liner 210 to non-structural stanchions 208, the systems and stanchions may be installed more efficiently since system run 212 may be installed first, i.e., without interference from non-structural stanchions 208 and cargo liner 210.

Referring generally to FIG. 1 and particularly to FIGS. 7A and 7B, the instant paragraph pertains to example 29 of the present disclosure. According to example 29, a method 700 of manufacturing a fuselage portion 200 comprises: structurally attaching floor beam 204 to frame 202, wherein floor beam 204 comprises ends 204A, 204B (block 702); installing structural stanchion 206 by structurally attaching first end 206A of structural stanchion 206 to floor beam 204 and second end 206B of structural stanchion 206 to frame 202 (block 704); and installing non-structural stanchion 208 by non-structurally attaching third end 208A of non-structural stanchion 208 to floor beam 204 and fourth end 208B of non-structural stanchion 208 to frame 202 (block 708).

The disclosed method of manufacturing a fuselage portion 200 utilizes the above-described arrangement of structural stanchions 206 and non-structural stanchions 208 in respect to frames 202 and floor beam(s) 204. The advantages of this method relate, inter alia, to the installation of cargo liner 210 and various optional systems 212, 214, 215. This method enables various systems to be quickly and efficiently installed in the fuselage cheeks outboard of the floor stanchions (see FIG. 3A), with other systems and cargo liner installed inboard of the structural stanchions (see FIGS. 1 and 3A). The method does not require the use of a deep floor beam or a deep frame at the floor, thus increasing available passenger space.

Referring generally to FIG. 1 and particularly to FIGS. 7A and 7B, the instant paragraph pertains to example 30 of the present disclosure. According to example 30, which includes the subject matter of example 29, above, method 700 further comprises installing non-structural stanchion 208 laterally inboard of structural stanchion 206 relative to ends 204A, 204B of floor beam 204 (block 708A).

This feature facilitates the manufacturing process since it enables the cargo liner 210 and systems 212, 214, 215 to be more efficiently installed after structural stanchions 208 supporting floor beam(s) 204 are installed.

Referring generally to FIG. 1 and particularly to FIGS. 7A and 7B, the instant paragraph pertains to example 31 of the present disclosure. According to example 31, which includes the subject matter of any of examples 29 and 30, above, method 700 further comprises installing non-structural stanchion 208 after installing structural stanchion 206 (block 708B).

By installing non-structural stanchion 208 after installing structural stanchion 206, various systems may be installed more efficiently since the system runs may be attached to the structural stanchions first, i.e., without interference from non-structural stanchions 208.

Referring generally to FIGS. 1 and 3A, and particularly to FIGS. 7A and 7B, the instant paragraph pertains to example 32 of the present disclosure. According to example 32, which includes the subject matter of any of examples 29-31, above, method 700 further comprises installing first system run 212 by attaching first system run 212 to structural stanchion 206 (block 706).

As discussed above with respect to example 31, by installing non-structural stanchion 208 after installing structural stanchion 206, first system run 212 may be installed more efficiently since it may be attached to structural stanchion 206 first, i.e., without interference from non-structural stanchions 208.

Referring generally to FIGS. 1 and 3A, and particularly to FIGS. 7A and 7B, the instant paragraph pertains to example 33 of the present disclosure. According to example 33, which includes the subject matter of example 32, above, method 700 further comprises installing first system run 212 before installing non-structural stanchion 208 (block 706A).

As discussed above with respect to example 32, by installing first system run 212 before installing non-structural stanchion 208, first system run 212 may be installed more efficiently since it may be attached to structural stanchion 206 first, i.e., without interference from non-structural stanchions 208.

Referring generally to FIGS. 1 and 3A, and particularly to FIGS. 7A and 7B, the instant paragraph pertains to example 34 of the present disclosure. According to example 34, which includes the subject matter of any of examples 32 and 33, above, method 700 further comprises installing second system run 214 by attaching second system run 214 to non-structural stanchion 208 (block 710).

By installing second system run 214 by attaching second system run 214 to non-structural stanchion 208, second system run 214 may be installed more efficiently since it may be attached to non-structural stanchion 208 after first system run 212 is attached to structural stanchion 206, i.e., without interference from structural stanchions 206.

Referring generally to FIGS. 1 and 3A, and particularly to FIGS. 7A and 7B, the instant paragraph pertains to example 35 of the present disclosure. According to example 35, which includes the subject matter of example 34, above, method 700 further comprises installing second system run 214 after installing first system run 212 (block 710A).

As discussed above, installing second system run 214 after installing first system run 212 (with second system run 214 attached to non-structural stanchion 208 and first system run 212 attached to structural stanchion 206), second system run 214 may be installed more efficiently since it may be attached to non-structural stanchion 208 after first system run 212 is attached to structural stanchion 206, and without interference from structural stanchion 206.

Referring generally to FIGS. 1 and 3A, and particularly to FIGS. 7A and 7B, the instant paragraph pertains to example 36 of the present disclosure. According to example 36, which includes the subject matter of any of examples 34-35, above, method 700 further comprises installing cargo liner 210 after installing second system run 214 by attaching cargo liner 210 to non-structural stanchion 208 (block 712).

As previously noted, cargo liner 210 may be fabricated from a fire-resistant material (e.g., woven fiberglass cloth) with a high strength-to-weight ratio, making it suitable for use as cargo or baggage bay lining. Moreover, any one of system runs 212, 214, 215 may be a portion of any one of a number of aircraft systems, including a propulsion system, electrical system, hydraulic system, and environmental system. Any number of other systems may be included as well. By attaching first system run 212 to structural stanchion 206, and attaching cargo liner 210 to non-structural stanchion 208, the systems and stanchions may be installed more efficiently since system run 212 may be installed first, i.e., without interference from non-structural stanchion 208 and cargo liner 210.

Referring generally to FIGS. 1 and 3A, and particularly to FIGS. 7A and 7B, the instant paragraph pertains to example 37 of the present disclosure. According to example 37, which includes the subject matter of example 36, above, method 700 further comprises attaching cargo liner 210 laterally inboard of non-structural stanchion 208 relative to ends 204A and 204B of floor beam 204 (block 712A).

The feature of attaching cargo liner 210 laterally inboard of non-structural stanchion 208 facilitates the manufacturing process since it enables cargo liner 210 to be more efficiently installed after non-structural stanchions 208 are installed.

Referring generally to FIGS. 1 and 3A, and particularly to FIGS. 7A and 7B, the instant paragraph pertains to example 38 of the present disclosure. According to example 38, which includes the subject matter of any of examples 32-37, above, method 700 further comprises installing third system run 215 before installing non-structural stanchion 208 by attaching third system run 215 to frame 202 (block 714).

By installing third system run 215 before installing non-structural stanchion 208, and attaching third system run 215 to frame 202, third system run 215 may be secured to frame 215 without interference from non-structural stanchion 208.

Referring generally to FIGS. 1 and 3A, and particularly to FIGS. 7A and 7B, the instant paragraph pertains to example 39 of the present disclosure. According to example 39, which includes the subject matter of example 38, above, method 700 further comprises installing third system run 215 before installing first system run 212 (block 714A).

By installing third system run 215 before installing first system run 212, third system run 215 may be installed without interference from first system run 212.

Referring generally to FIGS. 1 and 3A, and particularly to FIGS. 7A and 7B, the instant paragraph pertains to example 40 of the present disclosure. According to example 40, which includes the subject matter of any of examples 29-39, above, method 700 further comprises installing non-structural stanchion 208 parallel to structural stanchion 206 (block 708C).

Referring generally to FIGS. 1, 3, and 3A, and particularly to FIGS. 7A and 7B, the instant paragraph pertains to example 41 of the present disclosure. According to example 41, which includes the subject matter of any of examples 29-39, above, method 700 further comprises installing non-structural stanchion 208 at an oblique angle to structural stanchion 206 (block 708D).

With regard to examples 40 and 41, by enabling non-structural stanchion 208 to be either parallel to structural stanchion 206, or alternatively oblique to structural stanchion 206, flexibility in terms of the number of configurations that are available for improving space utilization within the area of fuselage portion 200 underneath floor beam(s) 204, i.e., for systems and cargo, is enhanced.

Referring generally to FIGS. 1, 3, and 3A, and particularly to FIGS. 7A and 7B, the instant paragraph pertains to example 42 of the present disclosure. According to example 42, which includes the subject matter of any of examples 29-41, above, method 700 further comprises installing structural stanchion 206 perpendicular to floor beam 202 (block 704A).

Referring generally to FIGS. 1, 3, and 3A, and particularly to FIGS. 7A and 7B, the instant paragraph pertains to example 43 of the present disclosure. According to example 43, which includes the subject matter of any of examples 29-41, above, method 700 further comprises installing structural stanchion 206 at an oblique angle to floor beam 202 (block 704B).

In regard to examples 42 and 43, by arranging structural stanchions 206 perpendicular to floor beam(s) 204, it is possible to increase the vertical load bearing capacity of the structural stanchions, particularly depending on how far inboard of ends 204A, 204B of floor beam(s) 204 the stanchions are installed. On the other hand, if structural stanchions 206 are installed close to the end of a floor beam (in the outboard direction), it may be advantageous for structural stanchions 206 to be at an oblique angle relative to the floor beam(s) (see FIG. 3). The angular relationship of the structural stanchions to the floor beam(s) can also affect the amount of available space under floor beam(s) 204 for systems and cargo.

Examples of the present disclosure may be described in the context of aircraft manufacturing and service method 800 as shown in FIG. 8 and aircraft 902 as shown in FIG. 9. During pre-production, illustrative method 800 may include specification and design block 804 of aircraft 902 and material procurement block 806. During production, component and subassembly manufacturing block 808 and system integration block 810 of aircraft 902 may take place. Thereafter, aircraft 902 may go through certification and delivery block 812 to be placed in service block 814. While in service, aircraft 802 may be scheduled for routine maintenance and service block 816. Routine maintenance and service may include modification, reconfiguration, refurbishment, etc. of one or more systems of aircraft 902.

Each of the processes of illustrative method 800 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 9, aircraft 902 produced by illustrative method 800 may include airframe 918 with a plurality of high-level systems 920 and interior 922. Examples of high-level systems 920 include one or more of propulsion system 924, electrical system 926, hydraulic system 928, and environmental system 930. Any number of other systems may be included. Although an aerospace example is shown, the principles disclosed herein may be applied to other industries, such as the automotive industry. Accordingly, in addition to aircraft 902, the principles disclosed herein may apply to other vehicles, e.g., land vehicles, marine vehicles, space vehicles, etc.

Apparatuses and methods shown or described herein may be employed during any one or more of the stages of the manufacturing and service method 800. For example, components or subassemblies corresponding to component and subassembly manufacturing 808 may be fabricated or manufactured in a manner similar to components or subassemblies produced while aircraft 802 is in service. Also, one or more examples of the apparatuses, methods, or combination thereof may be utilized during production stages 808 and 810, for example, by substantially expediting assembly of or reducing the cost of aircraft 802. Similarly, one or more examples of the apparatus or method realizations, or a combination thereof, may be utilized, for example and without limitation, while aircraft 802 is in service, e.g., maintenance and service stage block 816.

Different examples of the apparatuses and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A fuselage portion, comprising:
   a frame;
   a floor beam comprising ends directly attached to the frame;
   a structural stanchion, comprising a first end and a second end;
   a first structural coupling joining the first end of the structural stanchion and the floor beam;
   a second structural coupling joining the second end of the structural stanchion and the frame;
   a non-structural stanchion, comprising a third end and a fourth end;
   a first non-structural coupling joining the third end of the non-structural stanchion and the floor beam; and
   a second non-structural coupling joining the fourth end of the non-structural stanchion and the frame; and
   wherein the non-structural stanchion does not bear any load of the floor beam.

2. The fuselage portion according to claim 1, wherein the non-structural stanchion is laterally inboard of the structural stanchion relative to the ends of the floor beam.

3. The fuselage portion according to claim 1, further comprising:
   a cargo liner attached to the non-structural stanchion; and
   a first system run attached to the structural stanchion.

4. The fuselage portion according to claim 3, further comprising a second system run attached to the non-structural stanchion.

5. The fuselage portion according to claim 3, further comprising a third system run attached to the frame.

6. The fuselage portion according to claim 1, wherein the frame is not locally reinforced next to the floor beam.

7. The fuselage portion according to claim 1, wherein at least one of the first structural coupling between the first end of the structural stanchion and the floor beam or the second structural coupling between the second end of the structural stanchion and the frame comprises a fixed joint.

8. The fuselage portion according to claim 7, wherein the fixed joint comprises fasteners.

9. The fuselage portion according to claim 1, wherein at least one of the first structural coupling between the first end of the structural stanchion and the floor beam or the second structural coupling between the second end of the structural stanchion and the frame comprises a pinned clevis joint.

10. The fuselage portion according to claim 1, wherein at least one of the first non-structural coupling between the third end of the non-structural stanchion and the floor beam or the second non-structural coupling between the fourth end of the non-structural stanchion and the frame comprises a slip joint.

11. The fuselage portion according to claim 1, wherein at least one of the first non-structural coupling between the third end of the non-structural stanchion and the floor beam or the second non-structural coupling between the fourth end of the non-structural stanchion and the frame comprises a pin joint.

12. The fuselage portion according to claim 1, wherein at least one of the first non-structural coupling between the third end of the non-structural stanchion and the floor beam or the second non-structural coupling between the fourth end of the non-structural stanchion and the frame comprises a hook-and-loop coupling.

13. The fuselage portion according to claim 1, wherein at least one of the first non-structural coupling between the third end of the non-structural stanchion and the floor beam or the second non-structural coupling between the fourth end of the non-structural stanchion and the frame comprises a magnetic coupling.

14. A vehicle comprising a fuselage portion, the fuselage portion, comprising:
   frames;
   floor beams comprising ends directly attached to the frames;
   structural stanchions, comprising first ends and second ends;
   first structural couplings joining the first ends of the structural stanchions and the floor beams;
   second structural couplings joining the second ends of the structural stanchions and the frames;
   non-structural stanchions, comprising third ends and fourth ends; first non-structural couplings joining the third ends of the non-structural stanchions and the floor beams; and
   second non-structural couplings joining the fourth ends of the non-structural stanchions and the frames; and
   wherein the structural stanchions support substantially all of a load of the floor beams and the non-structural stanchions do not bear any load of the floor beams.

15. A method of manufacturing a fuselage portion, the method comprising:
   structurally attaching a floor beam to a frame, wherein the floor beam comprises ends directly attached to the frame;
   installing a structural stanchion by structurally attaching a first end of the structural stanchion to the floor beam and a second end of the structural stanchion to the frame; and
   installing a non-structural stanchion by non-structurally attaching a third end of the non-structural stanchion to the floor beam and a fourth end of the non-structural stanchion to the frame; and
   wherein the non-structural stanchion does not bear any load of the floor beam.

16. The method according to claim 15, further comprising installing the non-structural stanchion laterally inboard of the structural stanchion relative to the ends of the floor beam.

17. The method according to claim 15, further comprising installing the non-structural stanchion after installing the structural stanchion.

18. The method according to claim 15, further comprising installing a first system run by attaching the first system run to the structural stanchion.

19. The method according to claim 18, further comprising installing the first system run before installing the non-structural stanchion.

20. The fuselage portion according to claim 1, wherein:
the floor beam is one of a plurality floor beams;
the structural stanchion is one of a plurality of structural stanchions;
the first structural coupling is one of a plurality of first structural couplings;
the second structural coupling is one of a plurality of second structural couplings;
the non-structural stanchion is one of a plurality of non-structural stanchions;
the first non-structural coupling is one of a plurality of first non-structural couplings;
the second non-structural coupling is one of a plurality of second non-structural couplings;
the plurality of structural stanchions supports substantially all of the load of the plurality of floor beams; and
the plurality of non-structural stanchions does not bear any of the load of the plurality of floor beams.

21. The vehicle according to claim 14, wherein at least one of the first non-structural couplings or the second non-structural couplings comprises a slip joint.

22. The vehicle according to claim 14, wherein at least one of the first non-structural couplings or the second non-structural couplings comprises a pin joint.

23. The vehicle according to claim 14, wherein at least one of the first non-structural couplings or the second non-structural couplings comprises a hook-and-loop coupling.

\* \* \* \* \*